United States Patent [19]

Ohta

[11] Patent Number: 4,507,471

[45] Date of Patent: Mar. 26, 1985

[54] TRISAZO COMPOUNDS PREPARED FROM 4,4',4''-TRIAMINOTRIPHENYLAMINE AND 2-HYDROXY-3-PHENYLCARBAMOYLBEN-ZO[A]CARBAZOLE DERIVATIVES

[75] Inventor: Masafumi Ohta, Susono, Japan

[73] Assignee: Ricoh Company, Ltd., Tokyo, Japan

[21] Appl. No.: 379,688

[22] Filed: May 19, 1982

[30] Foreign Application Priority Data

| May 28, 1981 | [JP] | Japan | 56-80151 |
| May 28, 1981 | [JP] | Japan | 56-80161 |
| Jun. 10, 1981 | [JP] | Japan | 56-88102 |
| Jun. 10, 1981 | [JP] | Japan | 56-88111 |
| Jun. 12, 1981 | [JP] | Japan | 56-90611 |
| Jan. 18, 1982 | [JP] | Japan | 57-5682 |

[51] Int. Cl.³ ............... C07C 107/00; C07C 107/04; C09B 35/378; G03G 5/06
[52] U.S. Cl. ...................... 534/755; 430/58; 430/72; 430/73; 430/75; 430/76; 430/78; 430/79; 430/82; 534/558; 534/565; 534/887
[58] Field of Search ............... 260/164, 165

[56] References Cited

U.S. PATENT DOCUMENTS

4,279,981  7/1981  Ohta et al. ............... 430/73

FOREIGN PATENT DOCUMENTS

21728  2/1979  Japan ............... 260/164

OTHER PUBLICATIONS

Ota et al., Chemical Abstracts, vol. 90, #121293q (1979).

*Primary Examiner*—Floyd D. Higel
*Attorney, Agent, or Firm*—Flynn, Thiel, Boutell & Tanis

[57] ABSTRACT

Trisazo compounds having the following general formula I:

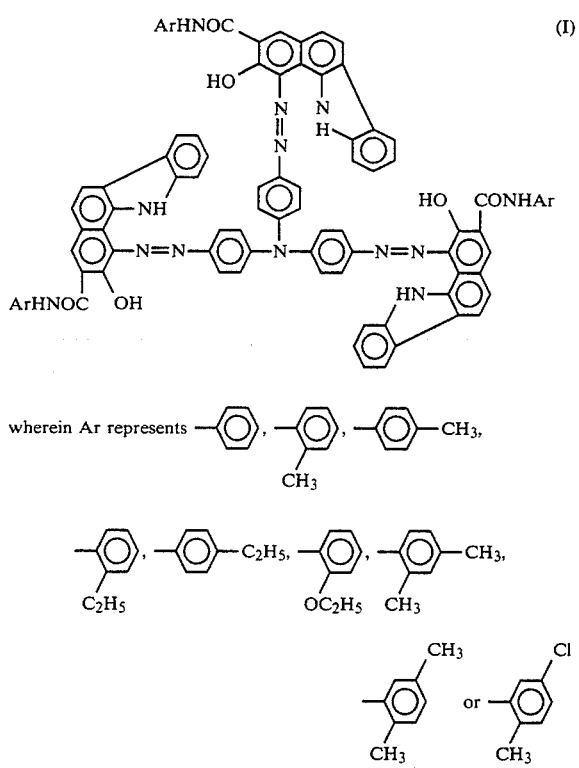

are useful as charge carrier generating materials for electrophotographic elements. Multilayer electrophotographic elements having a charge carrier generating layer containing these compounds as charge carrier generators and having a separate charge transport layer containing a charge transport material are particularly excellent in sensitivity in the 780-800 nm wavelength region.

5 Claims, 19 Drawing Figures

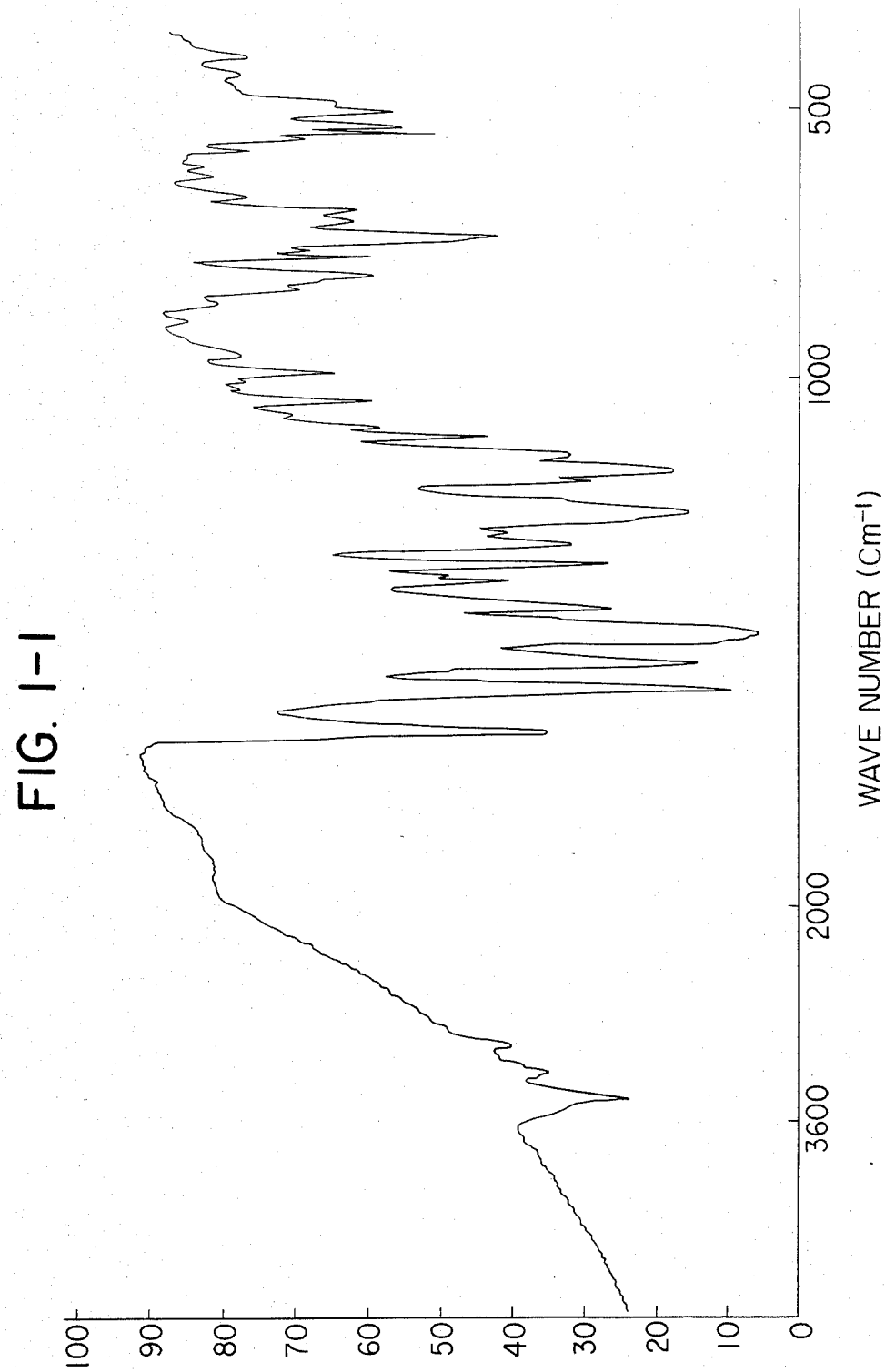

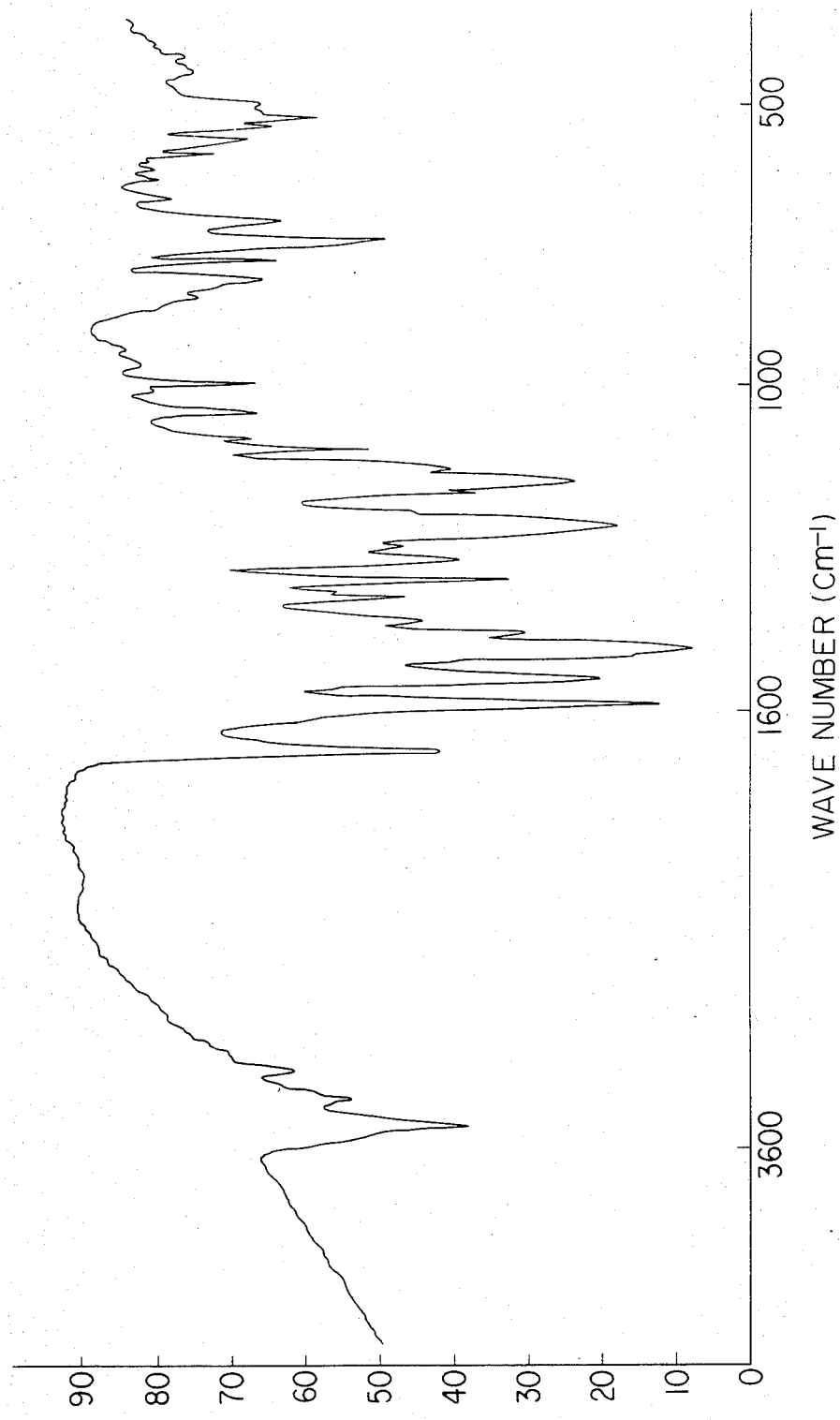

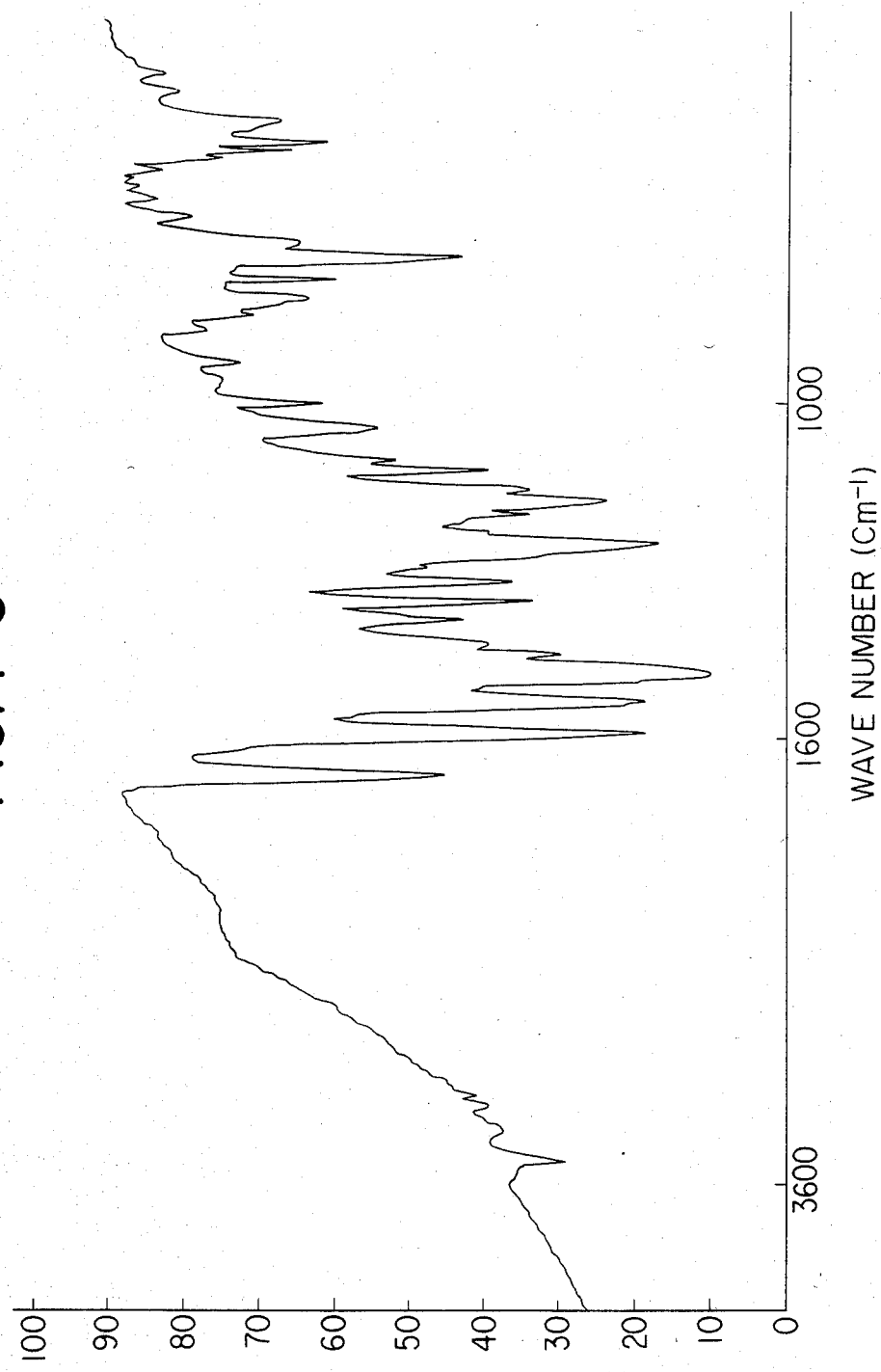

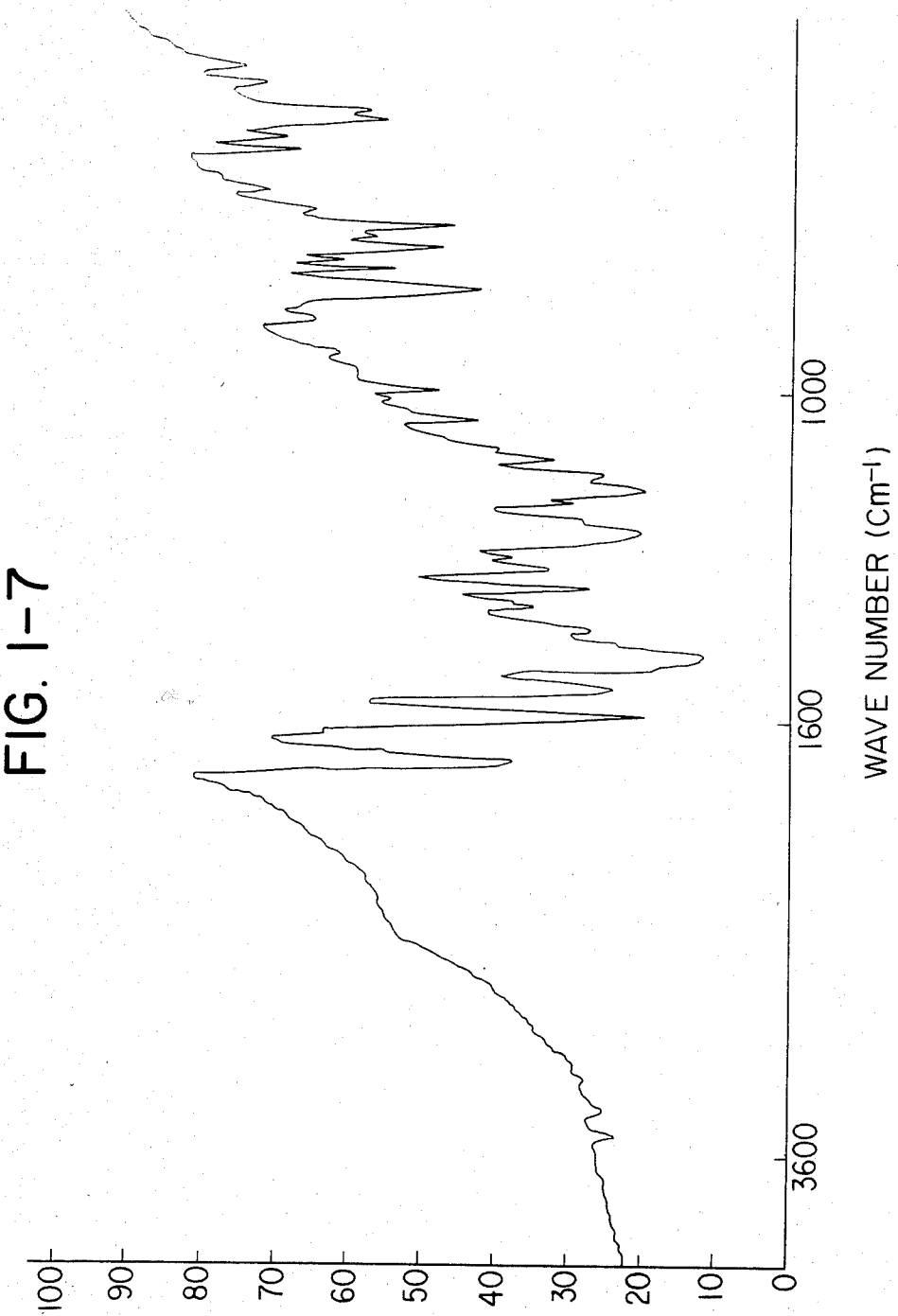
FIG. I-7

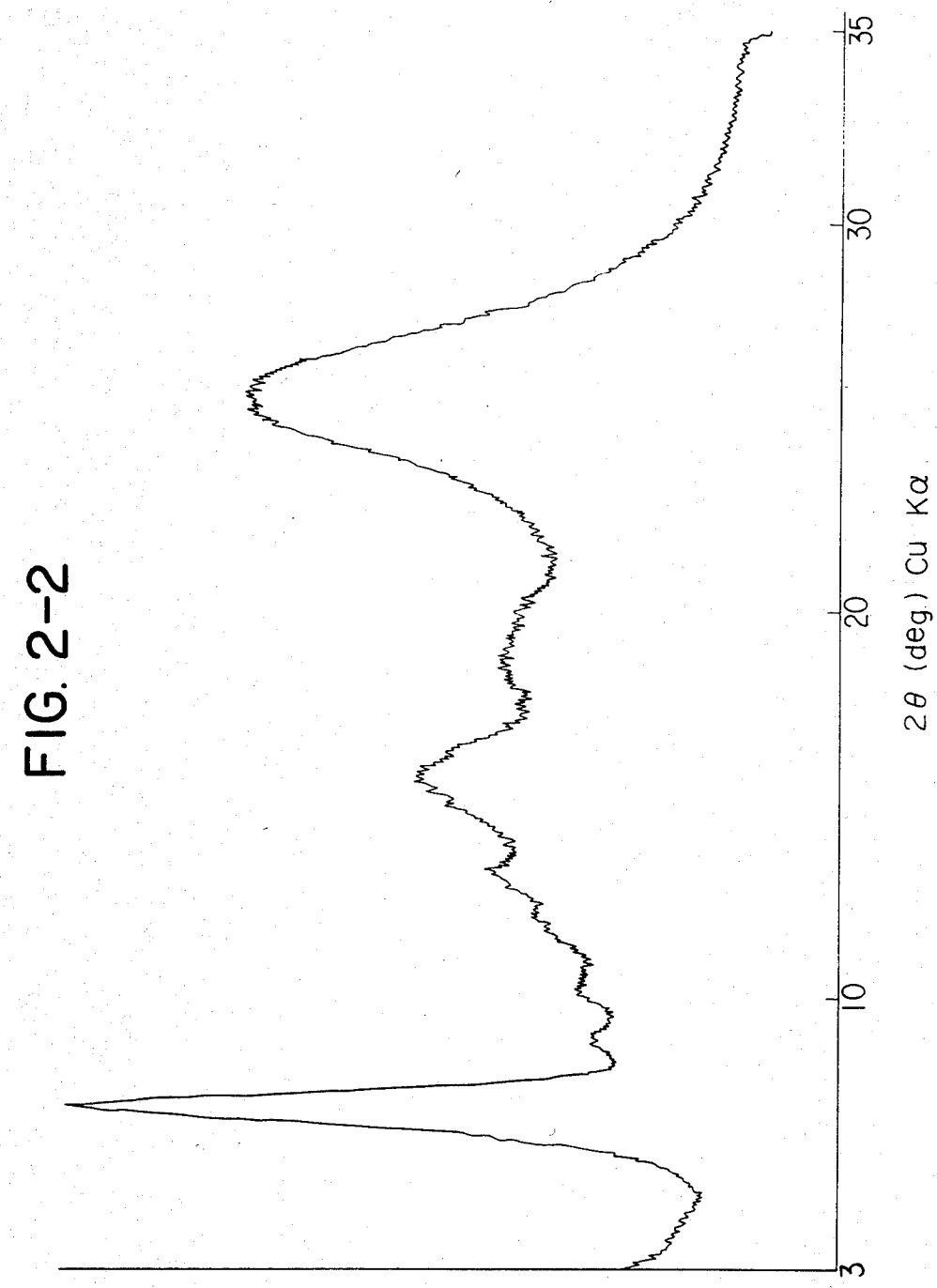

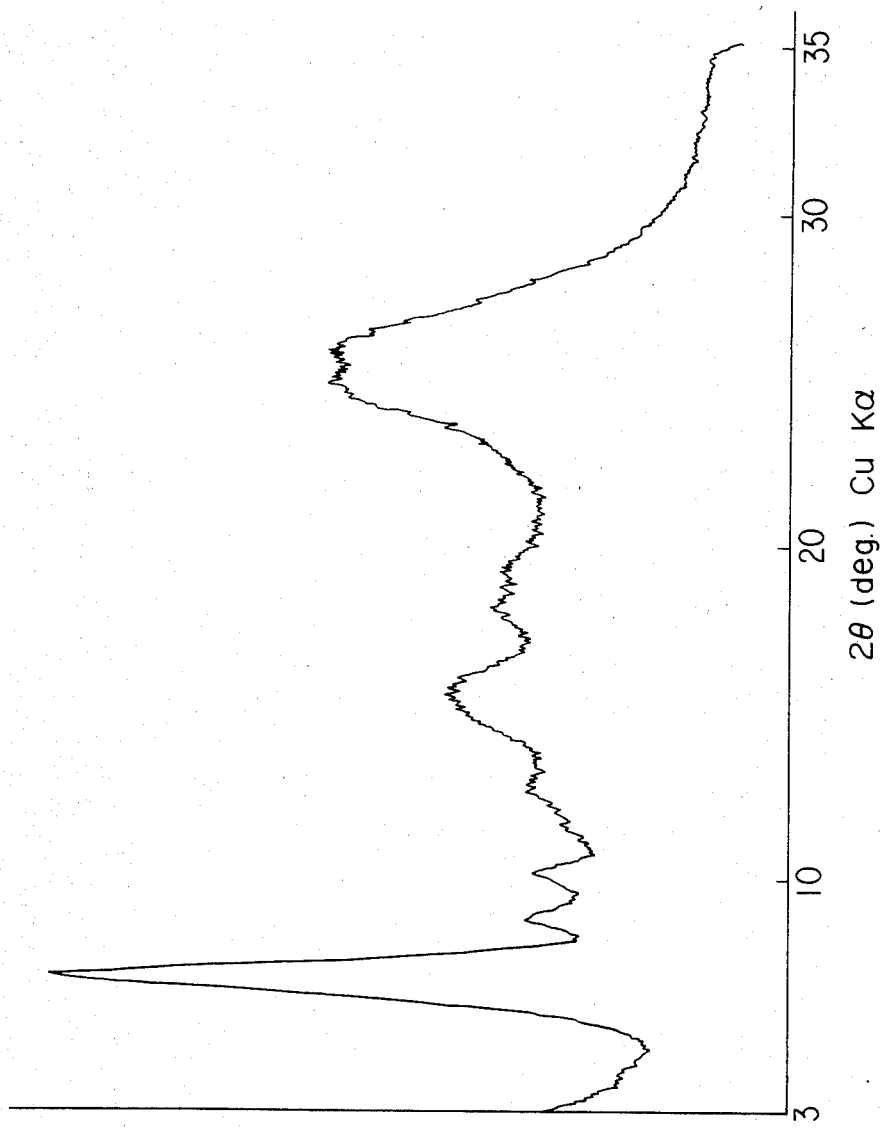

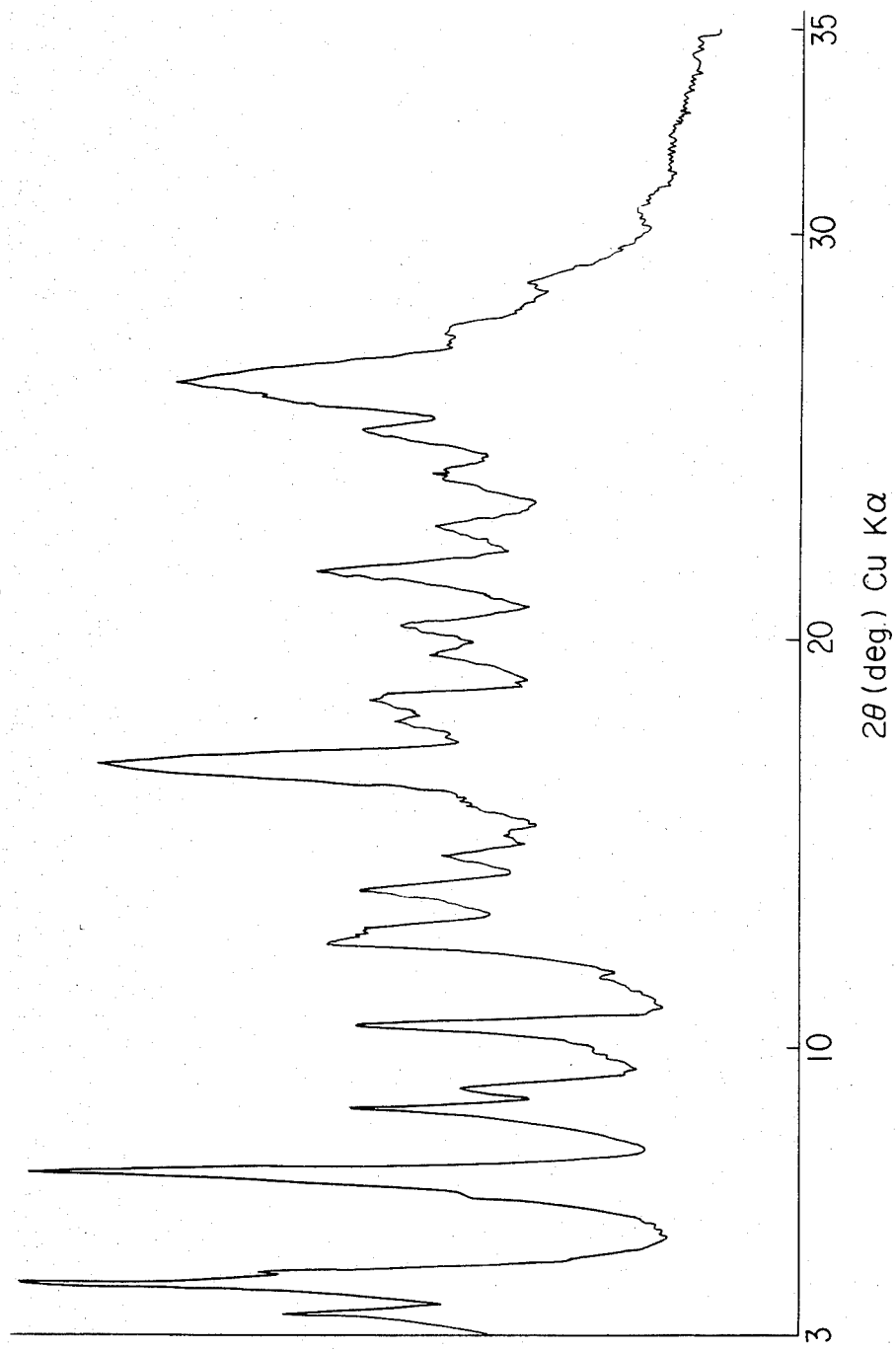

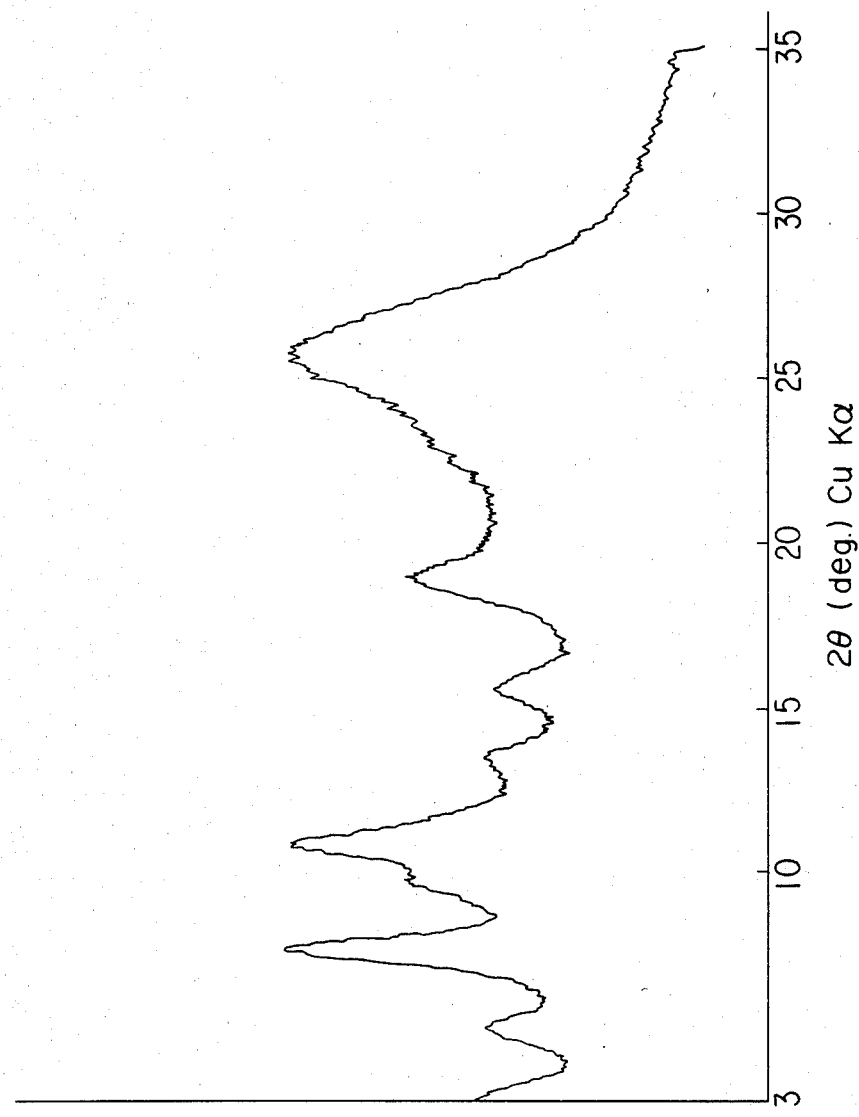

4,507,471

TRISAZO COMPOUNDS PREPARED FROM 4,4',4''-TRIAMINOTRIPHENYLAMINE AND 2-HYDROXY-3-PHENYLCARBAMOYLBENZO[A]-CARBAZOLE DERIVATIVES

BACKGROUND OF THE INVENTION (1) Field of the Invention

This invention relates to a novel trisazo compound, particularly useful as a charge carrier generating material for electrophotographic elements, and a process for manufacturing same.

(2) Description of the Prior Art

It has heretofore been known that trisazo or disazo compounds are effective as a charge carrier generating pigment used in a charge carrier generating layer of a multilayer-type electrophotographic element, one of the elements used in the electrophotographic processes. The multilayer-type electrophotographic element is an element comprising an electrically conductive substrate; a charge carrier generating layer which contains a charge carrier generating pigment capable of generating charge carriers when exposed to light radiation, which layer is formed as a thin film on the substrate by use of an adequate means, for example, vacuum deposition of the pigment, application of the pigment solution, or application of a resin-containing solution having fine particles of the pigment dispersed therein; and a charge transfer layer capable of accepting the charge carriers generated in the charge carrier generating layer and transferring them, which layer is formed on the charge carrier generating layer and usually contains a charge transfer substance and a binder. As disazo or trisazo compounds used in this kind of the electrophotographic element there have been known benzidine type disazo pigments disclosed in Japanese Laid-Open Patent Application Nos. 37543/1972 and 55643/1977, triphenylamine type trisazo pigments (see Japanese Laid-open Patent Application No. 132547/1978 and U.S. Pat. No. 4,279,981) and the like.

However, the multilayer-type electrophotographic elements using conventional disazo or trisazo compounds as charge carriers generating substance are defective in that these elements have a lower sensitivity than those using an inorganic substance such as arsenic selenide ($As_2Se_3$) alloy as photosensitive material, and are unsuitable for high speed copying machines. In addition, the demand for elements for use in laser printers, and the development of elements capable of exhibiting high sensitivity especially to the wavelength region of semiconductor lasers has been growing.

SUMMARY OF THE INVENTION

An object of the present invention is to provide a novel trisazo compound which has a sufficient sensitivity to the wavelength region of semiconductor lasers as well as the visible spectrum and can be used effectively as the charge carrier generating substance of the aforementioned electrophotographic element of multilayer type.

Another object of the present invention is to provide a process for manufacturing the trisazo compound.

Other objects of the present invention will be apparent from the following description.

I, the present inventor, have made strenuous studies on a large number of disazo and trisazo compounds for the purpose of developing charge carrier generating compounds which are highly sensitive and also have a substantially flat sensitivity throughout the total visible region and the wavelength region of semiconductor lasers. As a result, it has now been found that the characteristics of the trisazo compound having the structure as shown the following general formula I vary widely depending on the kind and position of a substituted group of the benzene ring attached to the terminal CONH-, and that the trisazo compounds having the particular Ar's shown in the general formula (I) exhibit especially superior characteristics.

A novel compound according to the present invention is a trisazo compound having the general formula (I):

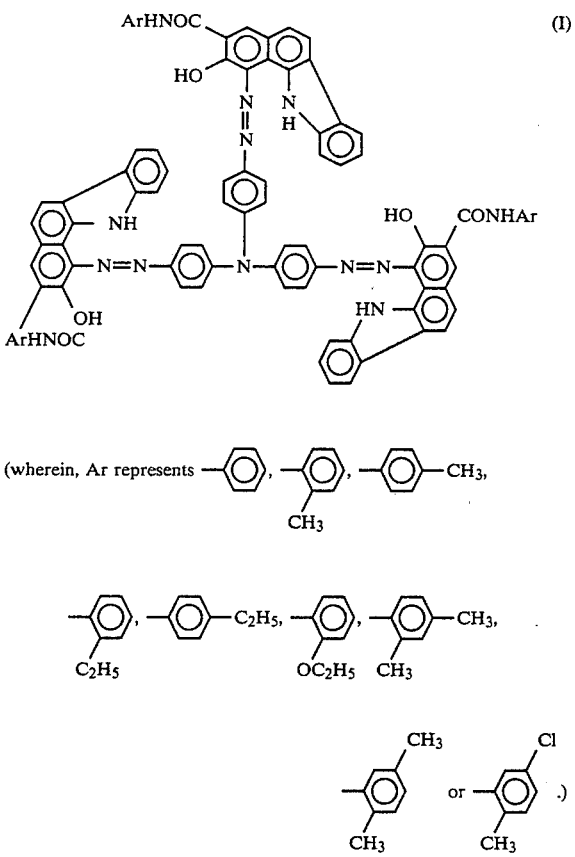

This novel trisazo compound is of a black crystal at room temperature.

The electrophotographic element using the trisazo compound of the present invention is never inferior in sensitivity even to the element using inorganic photosensitive material, and exhibits rapid response to the light as long as 800 nm.

The trisazo compounds of the present invention are labelled as in Table 1.

TABLE 1

[Structure shown with ArHNOC, HO, N=N, NH, OH, ArHNOC groups, and HO, CONHAr, HN groups]

| Compound No. | Ar | Compound No. | Ar |
|---|---|---|---|
| I-1 | –⟨phenyl⟩ | I-6 | –⟨phenyl⟩-OC₂H₅ (ortho) |
| I-2 | –⟨phenyl⟩-CH₃ | I-7 | –⟨phenyl⟩ with CH₃, CH₃ |
| I-3 | –⟨phenyl⟩-CH₃ | I-8 | –⟨phenyl⟩ with CH₃, CH₃ |
| I-4 | –⟨phenyl⟩-C₂H₅ | I-9 | –⟨phenyl⟩ with Cl, CH₃ |
| I-5 | –⟨phenyl⟩-C₂H₅ | | |

The infrared absorption spectra (according to KBr Tablet method) of Compound Nos. I-1, I-2, I-3, I-4, I-5, I-6, I-7, I-8 and I-9 where shown in FIGS. 1-1, 1-2, 1-3, 1-4, 1-5, 1-6, 1-7, 1-8 and 1-9, respectively. Also, the X-ray diffraction diagrams of Compound Nos. I-1 to I-9 were shown in FIGS. 2-1 to 2-9, respectively.

These trisazo compounds can be prepared through the procedure described below. That is to say, another embodiment of the present invention is a process of preparation of the foregoing novel trisazo compounds which comprises diazotizing 4,4′,4″-triaminotriphenylamine expressed by the following formula II:

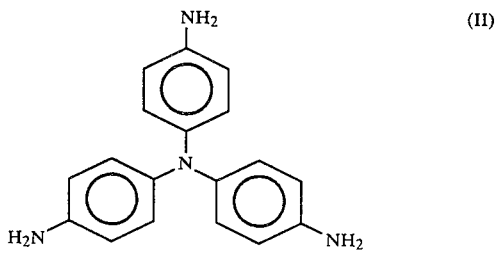

to obtain a hexazonium salt expressed by the general formula III:

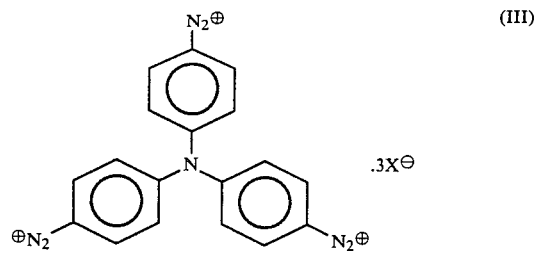

and reacting the thus obtained hexazonium salt with a 2-hydroxy-3-phenylcarbamoylbenzo[a]carbazole derivative expressed by the general formula IV:

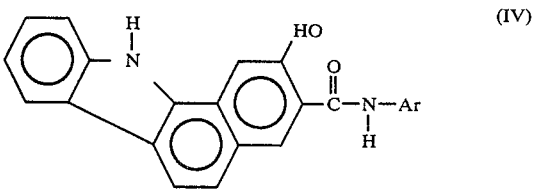

The diazotization reaction of 4,4′,4″-triaminotriphenylamine may be effected by adding thereto an aqueous solution of sodium nitrite within a dilute inorganic acid such as dilute hydrochloric acid or dilute sulfuric acid at a temperature of −10° C. to 10° C. This reaction completes in 30 minutes to 3 hours. Further, it is desirable to precipitate hexazonium salt by adding borofluoric acid or the like to the reactant mixture and then filtering said salt, thereby obtaining the crystals.

Subsequently, by adding the aforementioned 2-hydroxy-3-phenylcarbamoylbenzo[a]carbazole derivative (coupler) to this hexazonium salt, a coupling reaction is effected between the hexazonium salt and the coupling ingredient. Practically speaking, this reaction is effected through the procedure comprising preparing a solution by mixing the hexazonium salt and coupling ingredient with an organic solvent such as N,N-dimethylformamide, etc. and adding to the solution dropwise an aqueous solution of alkali such as sodium acetate at a temperature of about −10° C. to 10° C. This reaction completes in 5 minutes to 3 hours.

The resultant crystals are recovered and purified by a conventional process. The crystals, for example, are filtered, washed with water and/or organic solvent, and recrystallized, thereby, obtaining the trisazo compound.

BRIEF DESCRIPTION OF THE DRAWINGS

FIG. 2-1, FIG. 2-2, FIG. 2-3, FIG. 2-4, FIG. 2-5, FIG. 2-6, FIG 2-7, FIG. 2-8 and FIG. 2-9 show the X-ray diffraction diagrams of the trisazo compounds expressed by Compound No. I-1, No. I-2, No. I-3, No. I-4, No. I-5, No. I-6, No. I-7, No. I-8 and No. I-9, respectively.

FIG. 3 shows a schematic cross-sectional view of an electrophotographic element.

In FIG. 3, the reference numbers identify parts as follows:
1: an electrically conductive substrate,
2: a polyester base,
3: a deposited aluminum film,
4: a charge carrier generating layer, and
5: a charge transfer layer

DESCRIPTION OF THE PREFERRED EMBODIMENT

PREPARATION EXAMPLE 1

Figures 1, 2, 3:
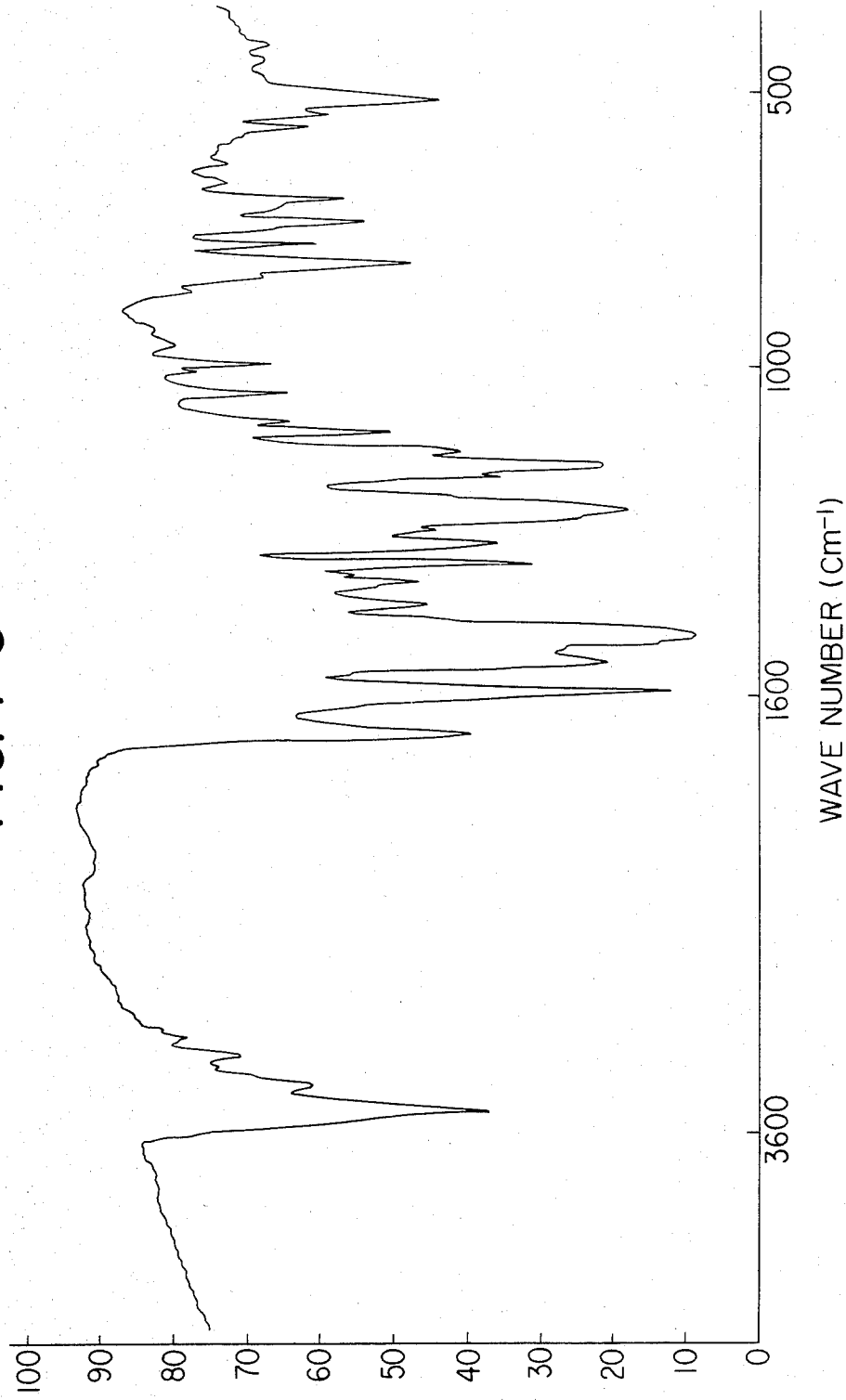
FIG. 1-1, FIG. 1-2, FIG. 1-3, FIG. 1-4, FIG. 1-5, FIG. 1-6, FIG. 1-7, FIG. 1-8 and FIG. 1-9 show the infrared absorption spectra (according to KBr tablet method) of the trisazo compounds expressed by Compound No. I-1, No. I-2, No. I-3, No. I-4, No. I-5, No. I-6, No. I-7, No. I-8 and No. I-9, respectively.
Figures 1, 2, 3, 4:
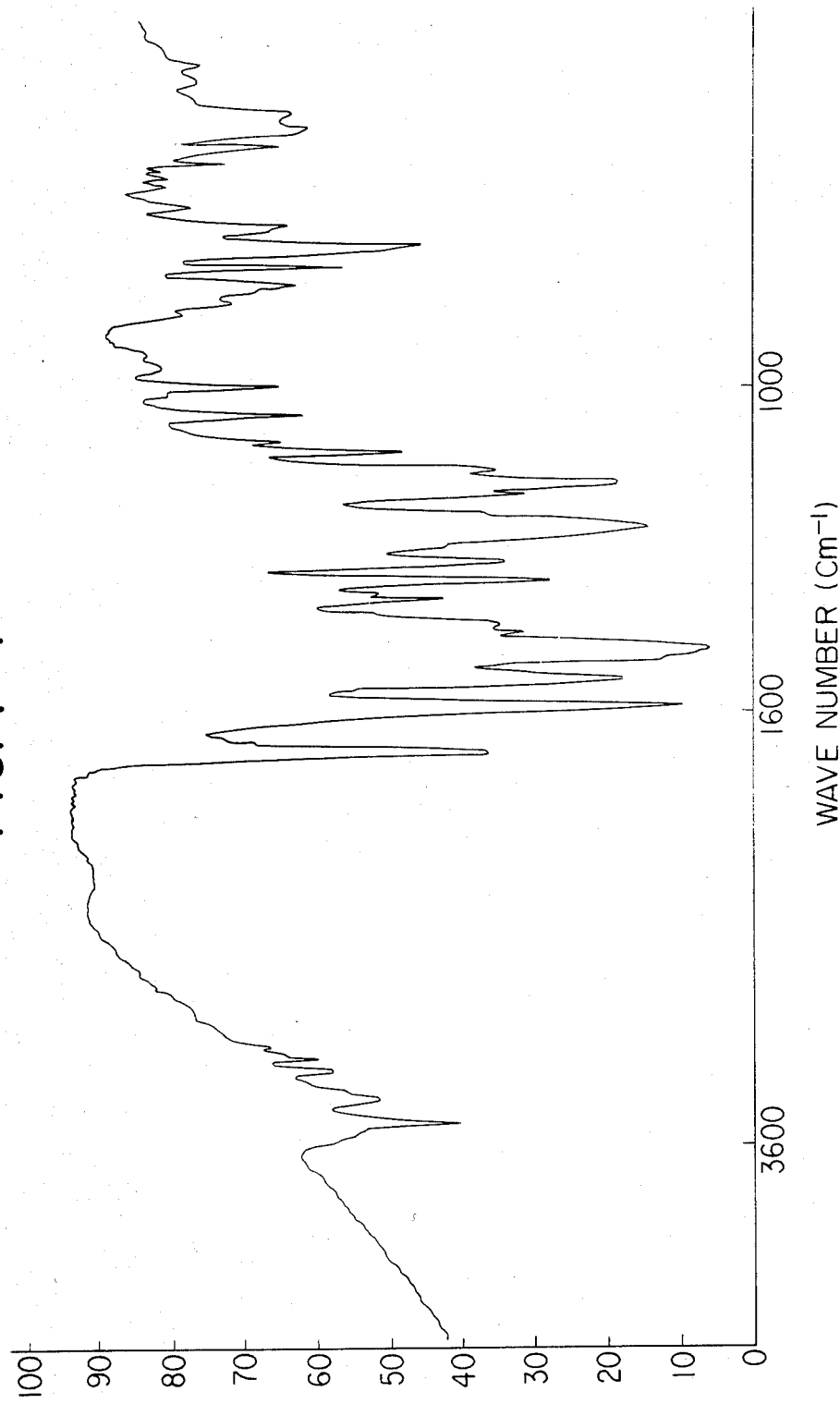
Figures 1, 2, 3, 4, 5:
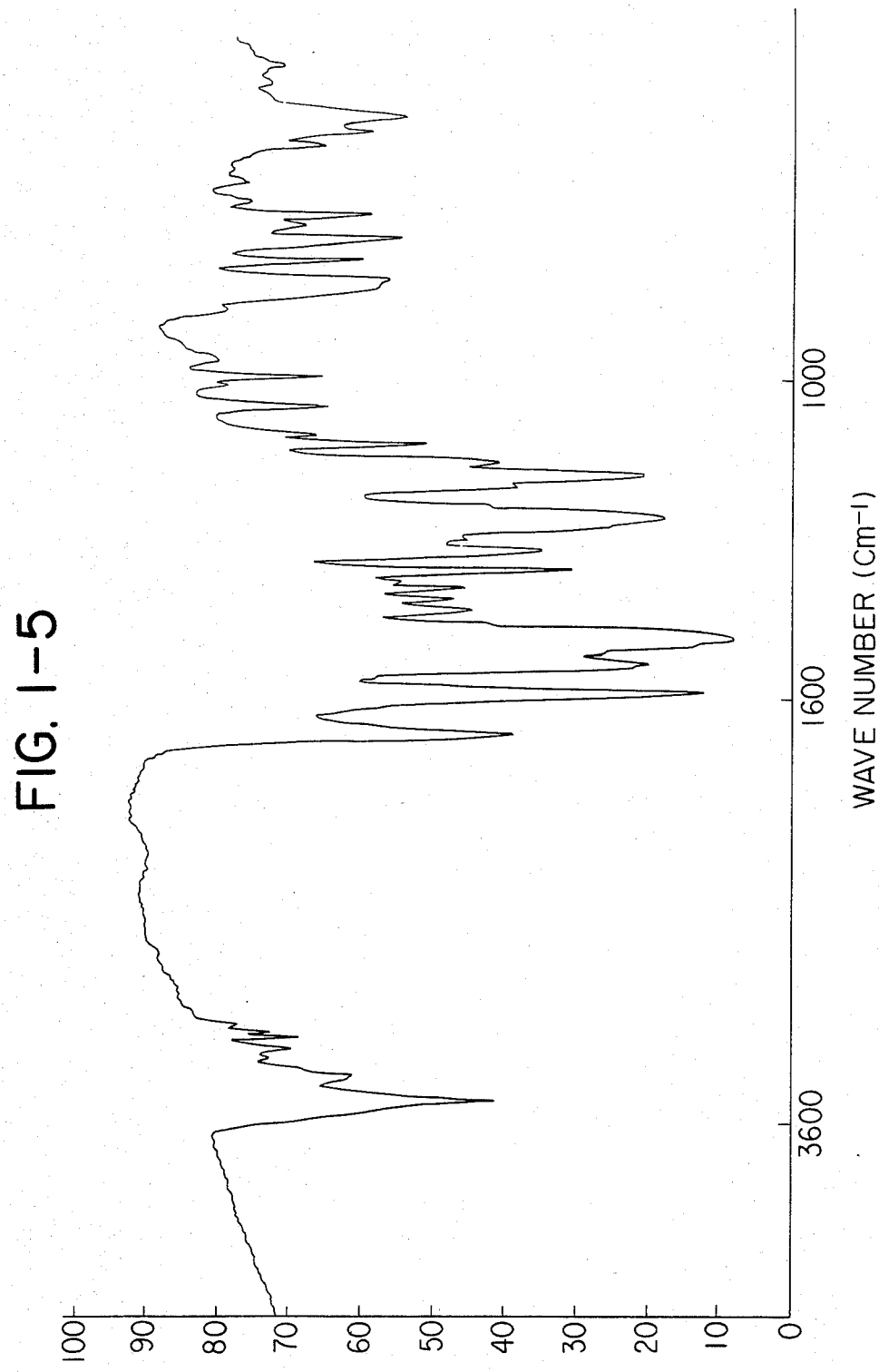
Figures 1, 2, 3, 4, 5, 6, 7, 8:
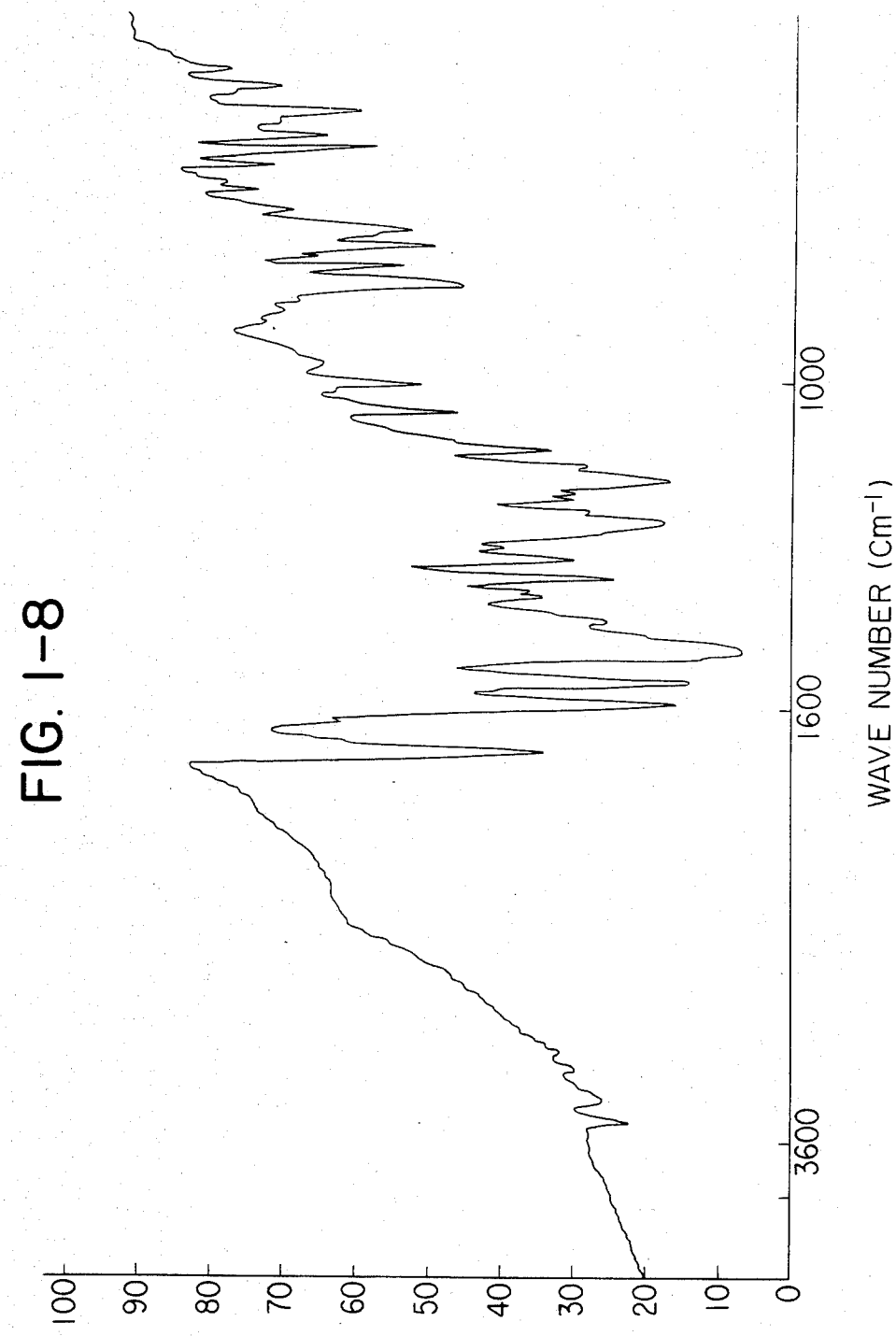
Figures 1, 2, 3, 4, 5, 6, 7, 8, 9:
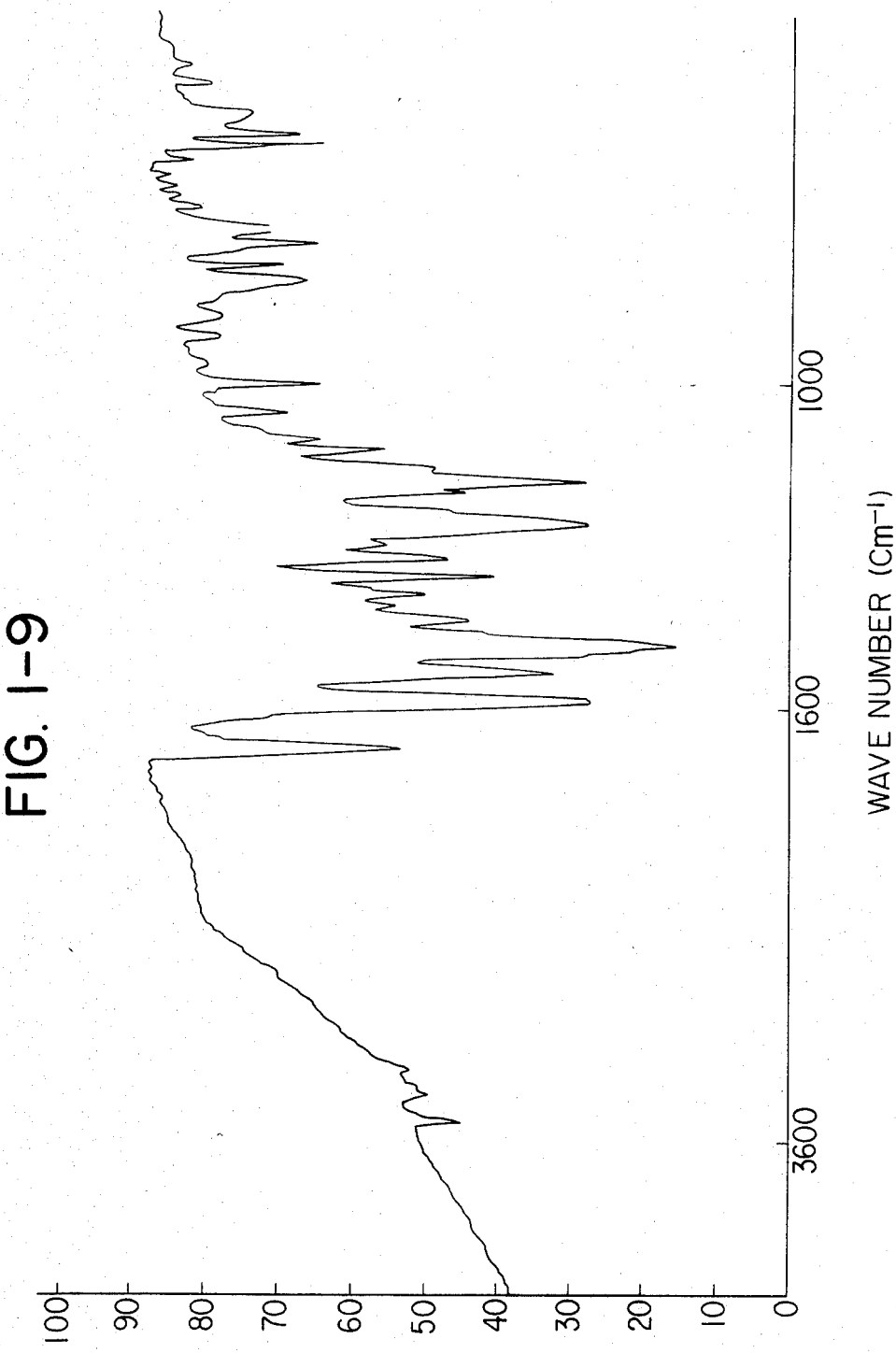
Figures 1, 2:
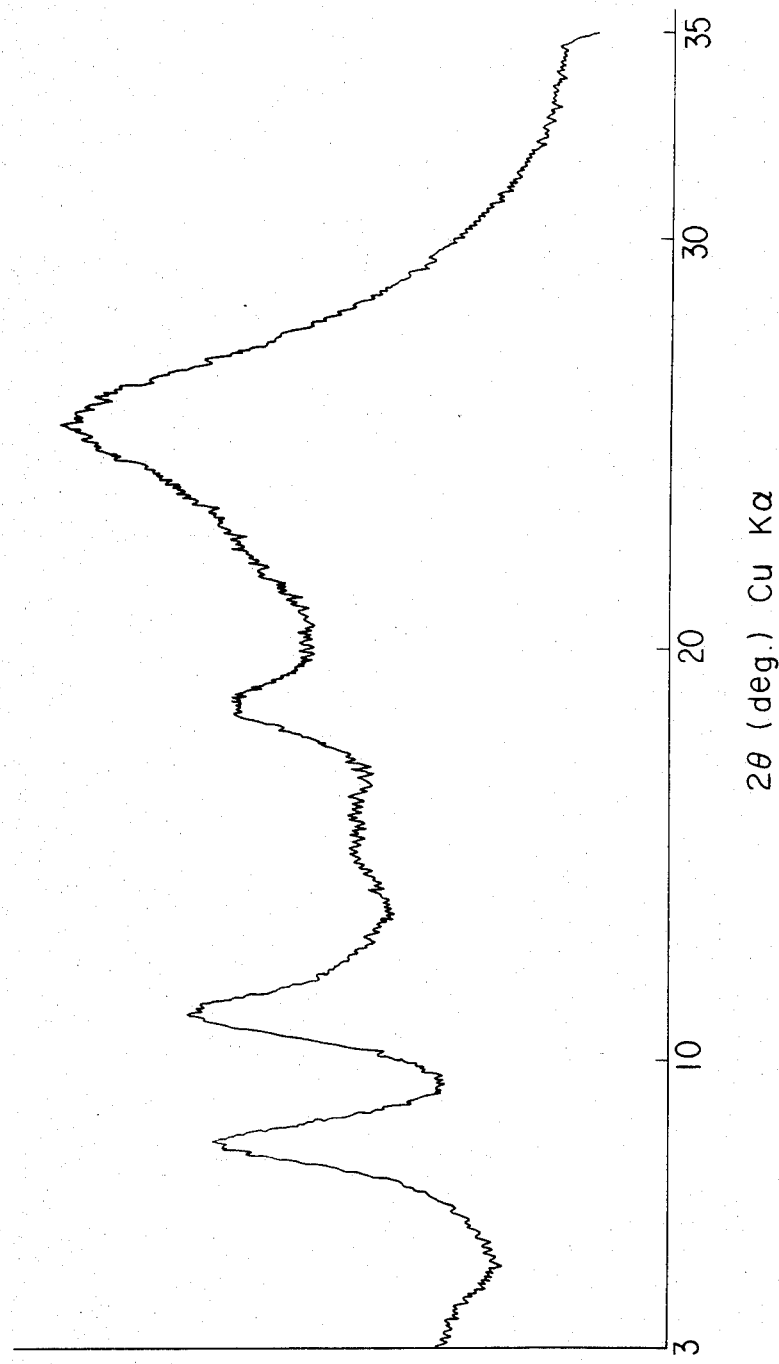
Figures 2, 3:
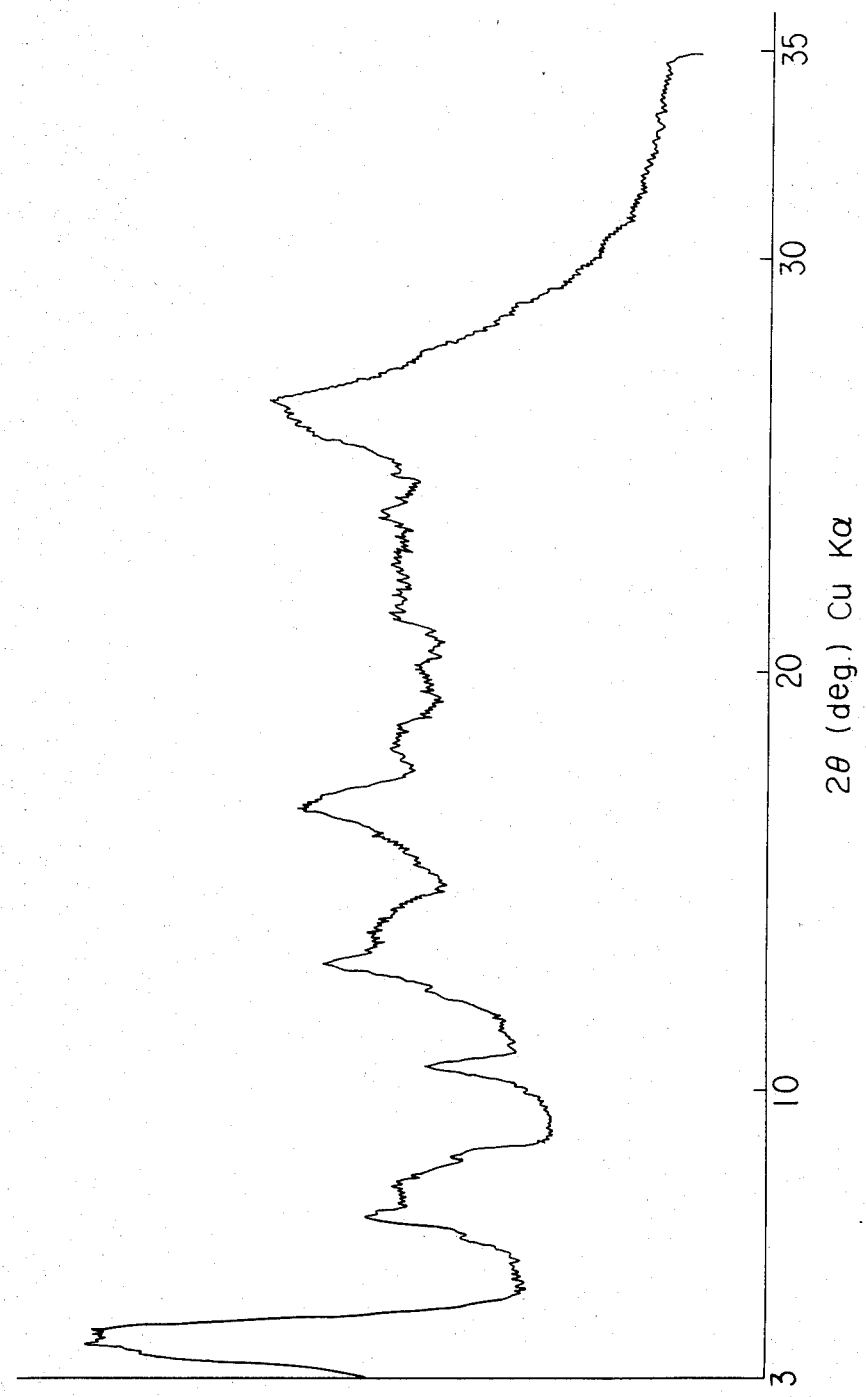
Figures 2, 3, 4, 5, 6:
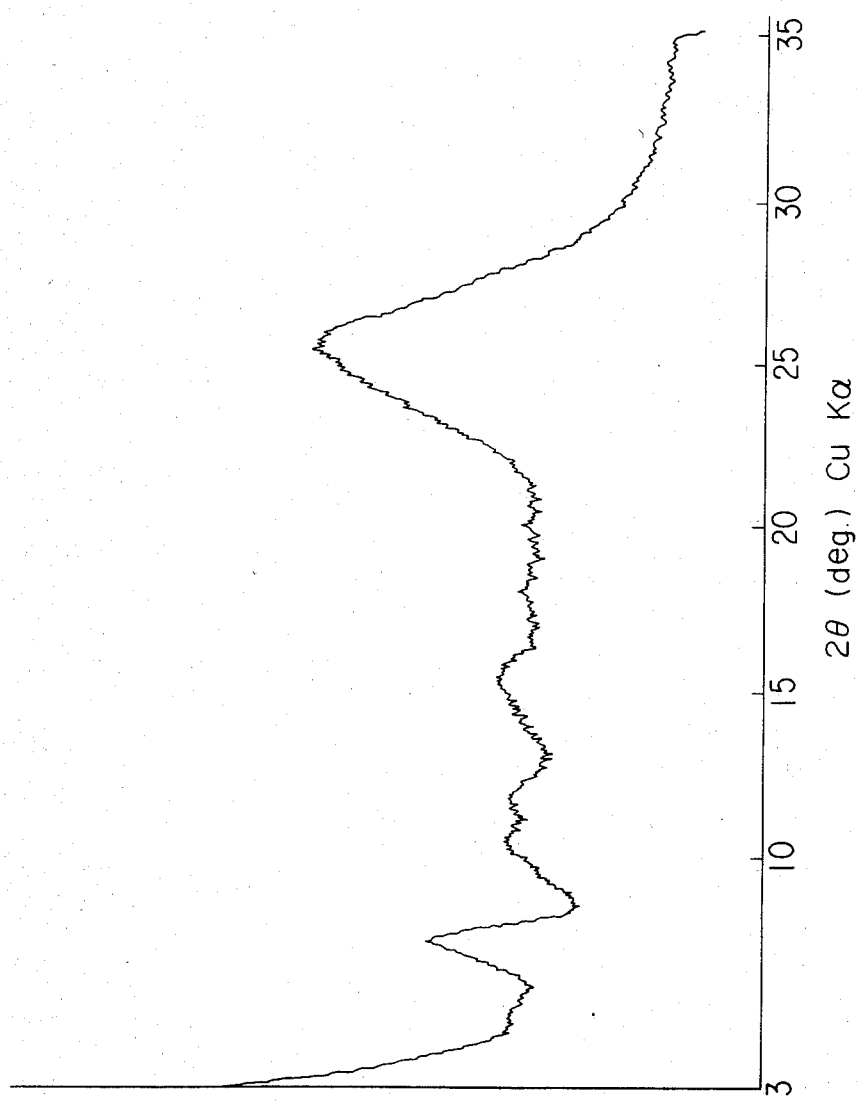
Figures 2, 3, 4, 5, 6, 7:
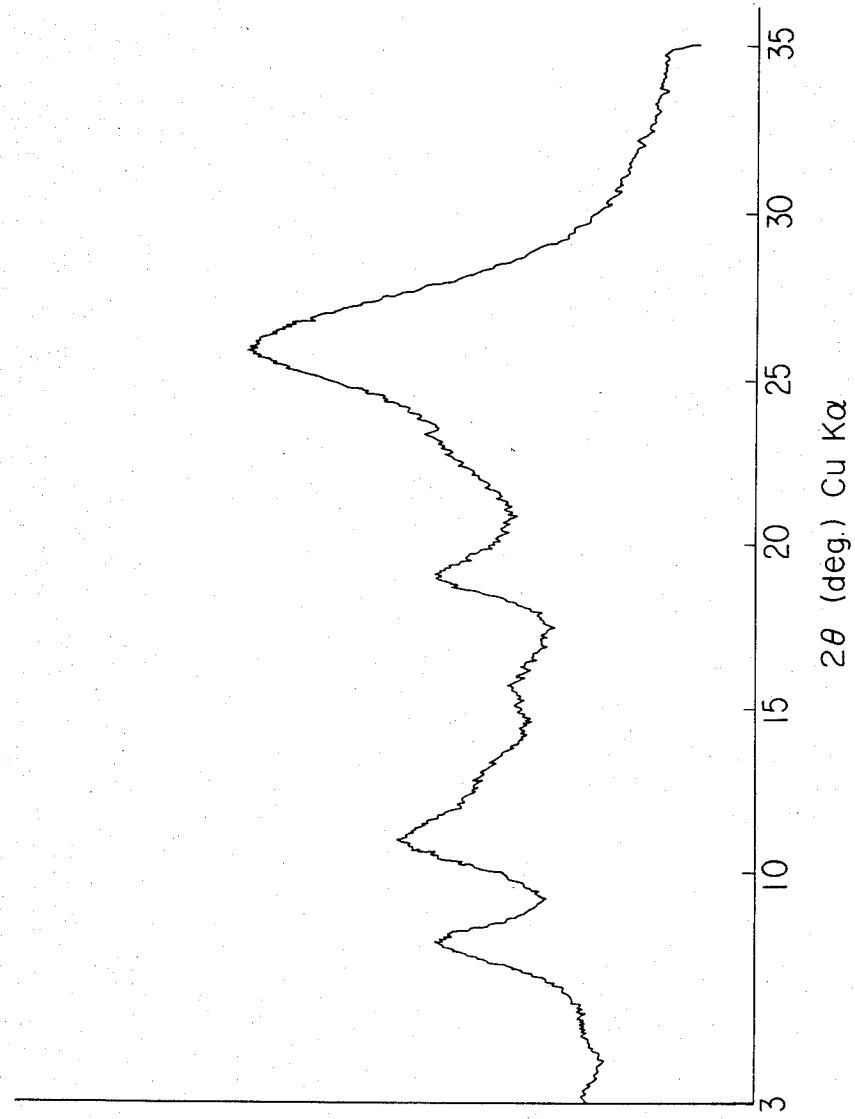
Figures 2, 3, 4, 5, 6, 7, 8, 9:
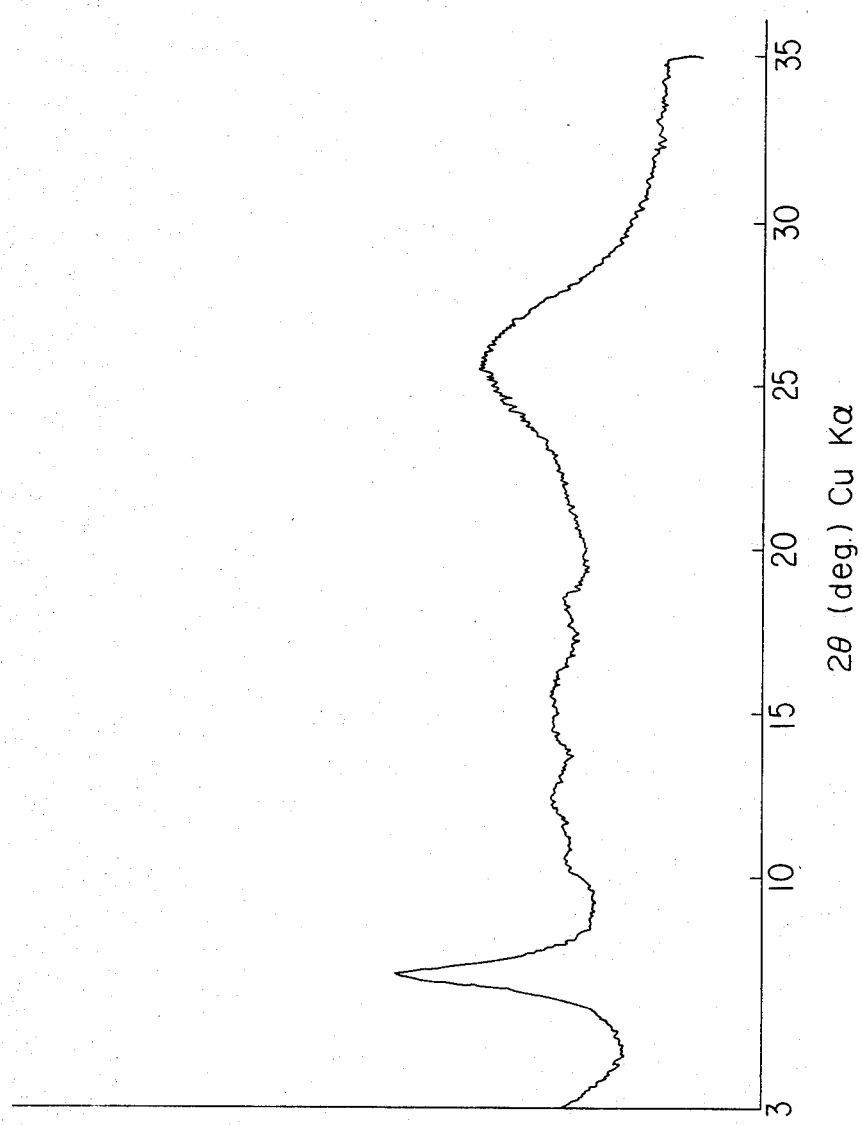
Figure 3:
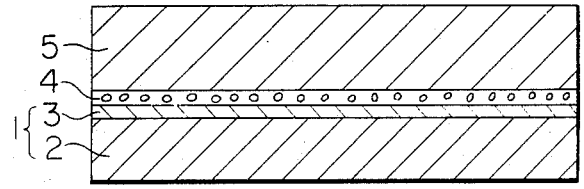

4,4′,4″-triaminotriphenylamine (8.7 g) was added to dilute hydrochloric acid prepared from conc. hydrochloric acid (150 ml) and water (130 ml), and the mixture was sufficiently agitated at room temperature for about 30 minutes. The mixture was then cooled to about 0° C., and a solution obtained by dissolving sodium nitrite (7.7 g) in water (30 ml) was dropwise added at a temperature of −3° C. to +2° C. over about 20 minutes. Then followed steps of agitating the mixture at that temperature for about one hour, filtering off a trace of insoluble matter, adding to the filtrate a 42% aqueous solution of borofluoric acid (60 ml), filtering the filtrate to recover the resulting precipitate, and washing it with water and drying, to obtain hexazonium trifluoroborate (15.3 g, Yield: 87%) in the form of yellow crystals (decomposition point: about 129° C.).

Next, the hexazonium salt obtained above (1.2 g) and 2-hydroxy-3-phenylcarbamoylbenzocarbazole (2.5 g) were dissolved in DMF (210 ml), and to the resulting solution was dropwise added a solution obtained by dissolving sodium acetate (2.9 g) in water (30 ml), at room temperature over about 5 minutes. The solution was then stirred at that temperature for 3 hours and then the resultant mixture was filtered to recover precipitated crystals.

Raw crystalline cake thus obtained was dispersed in DMF (300 ml) and the resulting dispersion was agitated at room temperature for about one hour, followed by again filtering the dispersion to recover crystals. This procedure was repeated four times. The resulting crystals were washed with water and dried to obtain a trisazo compound (No. I-1) of the present invention (1.5 g, yield 53%) as black crystals.

Decomposition point: 300° C. or higher
Elementary analysis values:

|     | Observed values | Calculated values |
| --- | --- | --- |
| C % | 75.53 | 75.69 |
| H % | 3.98  | 4.16  |
| N % | 12.85 | 13.19 |

Infrared absorption spectrum (according to KBr tablet method): $\nu_{C=O}$ (secondary amido) 1670 cm$^{-1}$.

PREPARATION EXAMPLE 2

The procedure described in the Preparation example 1 was repeated except that 2-hydroxy-3-phenylcarbamoylbenzo[a]carbazole (2.5 g) was replaced by 2-hydroxy-3-(2-methylphenylcarbamoyl)benzo[a]carbazole (2.7 g) to obtain a trisazo compound No. I-2 of the present invention (2.1 g, yield 72%).
Black crystal.
Decomposition point: 300° C. or higher.
Elementary analysis values:

|     | Observed values | Calculated values |
| --- | --- | --- |
| C % | 75.68 | 75.99 |
| H % | 4.23  | 4.46  |
| N % | 12.52 | 12.80 |

Infrared absorption spectrum (according to KBr tablet method): $\nu_{C=O}$ (secondary amido) 1670 cm$^{-1}$.

PREPARATION EXAMPLE 3

The procedure described in the Preparation example 1 was repeated except that 2-hydroxy-3-phenylcarbamoylbenzo[a]carbazole (2.5 g) was replaced by 2-hydroxy-3-(4-methylphenylcarbamoyl)benzo[a]carbazole (2.7 g), to obtain a trisazo compound No. I-3 of the present invention (2.0 g, yield 69%).
Black crystal.
Decomposition point: 300° C. or higher.
Elementary analysis values:

|     | Observed values | Calculated values |
| --- | --- | --- |
| C % | 75.71 | 75.99 |
| H % | 4.26  | 4.46  |
| N % | 12.54 | 12.80 |

Infrared absorption spectrum (according to KBr tablet method): $\nu_{C=O}$ (secondary amido) 1670 cm$^{-1}$.

PREPARATION EXAMPLE 4

The procedure described in the Preparation example 1 was repeated except that 2-hydroxy-3-phenylcarbamoylbenzocarbazole (2.5 g) was replaced by 2-hydroxy-3-(2-ethylphenylcarbamoyl)benzo[a]carbazole (2.8 g), to obtain a trisazo compound No. I-4 of the present invention (1.5 g, yield 50%).
Black crystal.
Decomposition point: 300° C. or higher
Elementary analysis values:

|     | Observed values | Calculated values |
| --- | --- | --- |
| C % | 75.93 | 76.26 |
| H % | 4.58  | 4.75  |
| N % | 12.50 | 12.43 |

Infrared absorption spectrum (according to KBr tablet method): $\nu_{C=O}$ (secondary amido) 1670 cm$^{-1}$.

PREPARATION EXAMPLE 5

The procedure described in the Preparation example 1 was repeated except that 2-hydroxy-3-phenylcarbamoylbenzo[a]carbazole (2.5 g) was replaced by 2-hydroxy-3-(4-ethylphenylcarbamoyl)benzo[a]carbazole (2.8 g), to obtain a trisazo compound No. I-5 of the present invention (1.9 g, yield 64%).
Black crystal.
Decomposition point: 300° C. or higher.
Elementary analysis values:

|     | Observed values | Calculated values |
| --- | --- | --- |
| C % | 76.41 | 76.26 |
| H % | 4.48  | 4.75  |
| N % | 12.16 | 12.43 |

Infrared absorption spectrum (according to KBr tablet method): $\nu_{c=0}$ (secondary amido) 1670 cm$^{-1}$.

PREPARATION EXAMPLE 6

The procedure described in the Preparation example 1 was repeated except that 2-hydroxy-3-phenylcarbamoylbenzo[a]carbazole (2.5 g) was replaced by 2-hydroxy-3-(2-ethoxyphenylcarbamoyl)benzo[a]carbazole (2.9 g), to obtain a trisazo compound No. I-6 of the present invention (2.3 g, yield 76%).
Black crystal.
Decomposition point: 300° C. or higher.
Elementary analysis values:

|     | Observed values | Calculated values |
| --- | --- | --- |
| C % | 73.59 | 73.84 |
| H % | 4.56 | 4.60 |
| N % | 11.79 | 12.04 |

Infrared absorption spectrum (according to KBr tablet method): $\nu_{c=0}$ (secondary amido) 1670 cm$^{-1}$.

PREPARATION EXAMPLE 7

The procedure described in the Preparation example 1 was repeated except that 2-hydroxy-3-phenylcarbamoylbenzo[a]carbazole (2.5 g) was replaced by 2-hydroxy-3-(2,4-dimethylphenylcarbamoyl)benzo[a]carbazole (2.7 g), to obtain a trisazo compound No. I-7 of the present invention (2.0 g, yield 68%).
Black crystal.
Decomposition point: 300° C. or higher.
Elementary analysis values:

|     | Observed values | Calculated values |
| --- | --- | --- |
| C % | 76.41 | 76.26 |
| H % | 4.46 | 4.75 |
| N % | 11.93 | 12.43 |

Infrared absorption spectrum (according to KBr tablet method): $\nu_{c=0}$ (secondary amido) 1680 cm$^{-1}$.

PREPARATION EXAMPLE 8

The procedure described in the Preparation example 1 was repeated except that 2-hydroxy-3-phenylcarbamoylbenzo[a]carbazole (2.5 g) was replaced by 2-hydroxy-3-(2,5-dimethylphenylcarbamoyl)benzo[a]carbazole (2.7 g), to obtain a trisazo compound No. I-8 of the present invention (1.9 g, yield 65%).
Black crystal.
Decomposition point: 300° C. or higher.
Elementary analysis values:

|     | Observed values | Calculated values |
| --- | --- | --- |
| C % | 76.09 | 76.26 |
| H % | 4.61 | 4.75 |
| N % | 11.93 | 12.43 |

Infrared absorption spectrum (according to KBr tablet method): $\nu_{c=0}$ (secondary amido) 1680 cm$^{-1}$.

PREPARATION EXAMPLE 9

The procedure described in the Preparation example 1 was repeated except that 2-hydroxy-3-phenylcarbamoylbenzo[a]carbazole (2.5 g) was replaced by 2-hydroxy-3-(2-methyl-5-chlorophenylcarbamoyl)benzo[a]carbazole (2.9 g), to obtain a trisazo compound No. I-9 of the present invention (2.4 g, yield 78%).
Black crystal.
Decomposition point: 300° C. or higher.
Elementary analysis values:

|     | Observed values | Calculated values |
| --- | --- | --- |
| C % | 70.50 | 70.84 |
| H % | 3.76 | 3.96 |
| N % | 11.92 | 11.93 |

Infrared absorption spectrum (according to KBr tablet method): $\nu_{c=0}$ (secondary amido) 1680 cm$^{-1}$.

The trisazo compounds of the present invention are effective as charge-generating pigments for electrophotographic elements of multilayer type, as described above, and in order to evidence this fact, a concrete use example thereof will be shown below. Further, in order to evidence the advance of the present invention, comparison of the trisazo compound with conventional azo compounds as well as comparison of electrophotographic elements using the trisazo compounds of the present invention with inorganic electrophotographic elements will also be shown below.

USE EXAMPLE

A trisazo compound (I-1) of the present invention (76 parts by weight), a tetrahydrofuran solution (1,260 parts by weight) of a polyester resin (Vylon 200, tradename of product manufactured by Toyo Boseki K.K.) (concentration of solid matter: 2%), and tetrahydrofuran (3,700 parts by weight) were mixed together by milling in a ball mill. The resulting dispersion was applied onto the aluminum surface of an aluminum-deposited polyester base (an electrically conductive substrate) by means of a doctor blade, followed by natural drying, to form a charge carrier generating layer of about 1 μm thickness. Then, 1-phenyl-3-(4-diethylaminostyryl)-5-(4-diethylaminophenyl)pyrazoline (one part by weight) as a charge transfer substance, a polycarbonate resin (Panlite K 1300, tradename of product manufactured by Teijin Kasei K.K.) (one part by weight) and tetrahydrofuran (8 parts by weight) were mixed and dissolved to form a solution. This solution was applied onto the charge carrier generating layer prepared above, by means of a doctor blade, and was then dried at 80° C. for 2 minutes and then at 100° C. for 5 minutes, to form a charge transfer layer of about 20 μm thickness. Thus, an electrophotographic element II-1, which is of multilayer type as shown in FIG 3, was prepared.

Electrophotographic elements II-2 to II-8 were prepared by repeating the above procedure except that combinations shown in the following Table 2 were employed. In the column "charge transfer substance" of this Table 2, D-1 represents 1-phenyl-3-(4-diethylaminostyryl)-5-(4-diethylaminophenyl)pyrazoline, D-2 represents 9-ethylcarbazole-3-carboxyaldehyde 1-methyl-1-phenylhydrazone and D-3 represents 9-(4-diethylaminophenyl)anthracene.

TABLE 2

| Electrophotographic element No. | Trisazo compound | Charge transfer substance |
| --- | --- | --- |
| II-2 | I-2 | D-1 |
| II-3 | I-3 | D-1 |
| II-4 | I-4 | D-2 |
| II-5 | I-5 | D-2 |
| II-6 | I-6 | D-1 |

TABLE 2-continued

| Electrophotographic element No. | Trisazo compound | Charge transfer substance |
|---|---|---|
| II-7 | I-7 | D-1 |
| II-8 | I-8 | D-1 |
| II-9 | I-9 | D-3 |

Next, the following electrophotographic elements were prepared for comparison.

COMPARATIVE EXAMPLE 1

The above Use example was repeated except that the trisazo compound of the present invention was replaced by 4,4′,4″-tris(2-hydroxy-3-phenylcarbamoyl-1-naphthylazo)triphenylamine which is a trisazo pigment of triphenylamine group, disclosed in Japanese Laid-open Patent Application No. 132547/1978, and 9-(4-diethylaminophenyl)anthracene was used as a charge transfer substance, to prepare an electrophotographic element for comparison, III-1.

COMPARATIVE EXAMPLE 2

Comparative example 1 was repeated except that the charge transfer substance of Comparative example 1 was replaced by 1-phenyl-3-(4-diethylaminostyryl)-5-(4-diethylaminophenyl)pyrazoline, to prepare an electrophotographic element for comparison, III-2.

COMPARATIVE EXAMPLE 3

Comparative example 1 was repeated except that the charge transfer substance of Comparative example 1 was replaced by 9-ethylcarbazole-3-carboxyaldehyde 1-methyl-1-phenylhydrazone, to prepare an electrophotographic element for comparison, III-3.

COMPARATIVE EXAMPLE 4

A polyester resin (10 parts by weight), 2,4,7-trinitro-9-fluorenone (10 parts by weight), a trisazo compound of the general formula (I) of the present invention except that Ar represents 2-methyl-4-methoxyphenyl group disclosed in Japanese Laid-open Patent Application No. 132347/1978 (2 parts by weight) and tetrahydrofuran (198 parts by weight) were mixed together by milling in a ball mill, and the resulting dispersion was applied onto an aluminum-deposited film by means of a doctor blade, and then dried at 100° C. for 10 minutes, to prepare an electrophotographic element for comparison, having a photosensitive layer of 10 μm thickness (III-4).

COMPARATIVE EXAMPLE 5

4,4′-bis(2-hydroxy-3-phenylcarbamoyl-1-naphthylazo)-3,3′-dichlorodiphenyl (1.08 part by weight) which is a benzidine disazo pigment, disclosed in the above-mentioned Japanese Laid-open Patent Application No. 37543/1972 or Japanese Laid-open Patent Application No. 55643/1977, was dissolved in ethylenediamine (24.46 parts by weight). To the resulting solution were added n-butylamine (20.08 parts by weight) with stirring, and further added tetrahydrofuran (54.36 parts by weight), to prepare a coating solution for a charge carrier generating layer, which was then applied onto an aluminum-deposited polyester film by means of a doctor blade and dried at 80° C. for 5 minutes to form a charge carrier generating layer of about 0.5 μm thickness. Onto this charge carrier generating layer was applied a solution consisting of 1-phenyl-3-(4-diethylaminostyryl)-5-(4-diethylaminophenyl)-pyrazoline (one part by weight), a polycarbonate resin (Panlite K-1300, tradename of product manufactured by Teijin Kasei K.K.) (one part by weight), and tetrahydrofuran (8 parts by weight), by means of a doctor blade. This solution was dried at 80° C. for 2 minutes and then at 100° C. for 5 minutes, to form a charge transfer layer of about 20 μm thickness. Thus, electrophotographic element for comparison III-5 was prepared.

COMPARATIVE EXAMPLE 6

A Se—As alloy (As: 40% by weight) as a depositing raw material was deposited onto an aluminum base at a base temperature of 200° C., at a depositing source temperature of 410° C. to 415° C. and under vacuum of $10^{-6}$ Torr to prepare a $As_2Se_3$ electrophotographic element having a photosensitive layer of about 60 μm thickness. This inorganic electrophotographic element for comparison is named III-6.

Next, with 15 electrophotographic elements prepared as described above, static characteristics were measured by means of a commercially available electrostatic copying paper tester (SP-428 type, tradename of apparatus manufactured by Kawaguchi Denki Seisakusho).

First, a corona discharge of −6 KV (or +6 KV) was applied to the respective electrophotographic elements for 20 seconds whereby they were negatively (or positively) charged, followed by allowing them to stand for 20 seconds in a dark place wherein the surface potential Vpo (V)s thereof at that time were measured. They where then irradiated by a light emitted from a tungsten lump so that an illuminance of 20 luxes was given on their surfaces, and the period of time (seconds) till the surface potential reached ½ and 1/10 of Vpo was measured, to calculate the quantity of exposure to light E½ and E1/10 (lux·sec). The results are shown in Table 3.

TABLE 3

| Electrophotographic element No. | Vpo (volt) | E½ (lux · sec.) | E1/10 (lux · sec.) |
|---|---|---|---|
| II-1 | −643 | 2.3 | 7.0 |
| II-2 | −353 | 2.1 | 4.8 |
| II-3 | −804 | 1.0 | 1.8 |
| II-4 | −917 | 0.9 | 1.8 |
| II-5 | −687 | 2.5 | 5.8 |
| II-6 | −669 | 1.0 | 2.3 |
| II-7 | −526 | 2.0 | 4.3 |
| II-8 | −513 | 1.3 | 3.7 |
| II-9 | −877 | 0.7 | 1.7 |
| III-1 | −915 | 9.1 | 39 |
| III-2 | −385 | 7.7 | 29 |
| III-3 | −785 | 8.1 | 33 |
| III-4 | −650 | 27.4 | 83 |
| III-5 | −603 | 1.9 | 4.1 |
| III-6 | +1198 | 1.3 | 2.3 |

Further, in order to evidence that the electrophotographic elements of the present invention have a very excellent sensitivity to light having long wavelengths, the following measurement was carried out.

First, the electrophotographic elements were electrically charged by corona discharge in a dark place (the electrophotographic elements II-1 to II-9 and III-1 to III-5 were negatively charged and the electrophotographic element III-5 was positively charged) to measure the respective surface potentials, and the elements were then irradiated a spectral monochrome light of 1 μW/cm³. The period of time (seconds) until the surface potential thereof decayed down to ½ was measured the dark-decayed portion of the surface potential has been compensated for), and also the exposure amount (μW·sec/cm²) was measured to calculate the light decay speed (volt·cm²·μW⁻¹·sec⁻¹) at 780 nm and 800 nm. The results are shown in Table 4.

TABLE 4

| Electrophotographic element No. | Wavelength of irradiation light (nm) | Surface potential (volt) | Light decay speed (volt · cm² · μW⁻¹ · sec) |
| --- | --- | --- | --- |
| II-1 | 780 | −600 | 170 |
|  | 800 | −600 | 160 |
| II-2 | 780 | −400 | 180 |
|  | 800 | −400 | 150 |
| II-3 | 780 | −800 | 950 |
|  | 800 | −800 | 830 |
| II-4 | 780 | −800 | 1100 |
|  | 800 | −800 | 990 |
| II-5 | 780 | −700 | 130 |
|  | 800 | −700 | 120 |
| II-6 | 780 | −700 | 590 |
|  | 800 | −700 | 560 |
| II-7 | 780 | −600 | 200 |
|  | 800 | −600 | 150 |
| II-8 | 780 | −600 | 320 |
|  | 800 | −600 | 270 |
| II-9 | 780 | −800 | 880 |
|  | 800 | −800 | 730 |
| III-1 | 780 | −800 | 10 or less |
|  | 800 | −800 | 10 or less |
| III-2 | 780 | −400 | 10 or less |
|  | 800 | −400 | 10 or less |
| III-3 | 780 | −700 | 10 or less |
|  | 800 | −700 | 10 or less |
| III-4 | 780 | −800 | 10 or less |
|  | 800 | −800 | 10 or less |
| III-5 | 780 | −600 | 10 or less |
|  | 800 | −600 | 10 or less |
| III-6 | 780 | +800 | 30 |
|  | 800 | +800 | 15 |

As apparent from the results listed in Table 3 and Table 4, the electrophotographic elements derived from the present invention II-1 to II-9 are not inferior in the sensitivity within the visible light region to other electrophotographic elements, and have a sensitivity of several tens times or more those of other electrophotographic elements particularly in the wavelength regions of semiconductor lasers.

As described above, the trisazo compounds of the present invention are a very useful material for electrophotographic elements, and have a number of advantages such as light weight, low cost, etc. since the compounds are organic. This, it will be well understood that the trisazo compounds of the present invention are a very excellent material.

What is claimed is:

1. A trisazo compound having the formula:

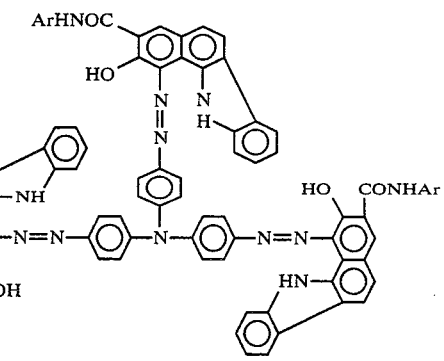

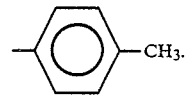

2. A trisazo compound according to claim 1 wherein Ar represents

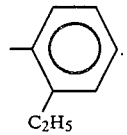

3. A trisazo compound according to claim 1 wherein Ar represents

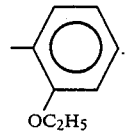

4. A trisazo compound according to claim 1 wherein Ar represents

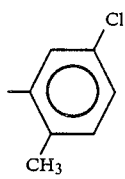

5. A trisazo compound according to claim 1 wherein Ar represents

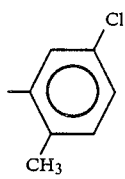

* * * * *